United States Patent [19]

Culver

[11] 4,013,874

[45] Mar. 22, 1977

[54] ADDRESS DECODER FOR USE WITH MULTICHANNEL ANALYZERS

[75] Inventor: Richard B. Culver, Houston, Tex.

[73] Assignee: Dresser Industries, Inc., Dallas, Tex.

[22] Filed: Sept. 5, 1975

[21] Appl. No.: 610,600

Related U.S. Application Data

[63] Continuation of Ser. No. 244,013, April 14, 1972, abandoned.

[52] U.S. Cl. .................... 235/92 PC; 235/92 CA; 235/92 R; 340/146.2
[51] Int. Cl.² ...................... G01T 1/00; G05B 1/03
[58] Field of Search ..... 235/92 CA, 92 MT, 92 PB, 235/92 PC, 92 DP; 340/172.5, 146.2

[56] References Cited

UNITED STATES PATENTS

| | | | |
|---|---|---|---|
| 2,879,498 | 3/1959 | Kalin | 340/146.2 |
| 3,290,647 | 12/1966 | Joseph et al. | 340/146.2 |
| 3,327,116 | 6/1967 | Loveday | 340/146.2 |
| 3,573,855 | 4/1971 | Cragon et al. | 340/172.5 |

OTHER PUBLICATIONS

IBM Technical Disclosure Bulletin, vol. 7, No. 12, May 1965, pp. 1158–1159, *Range Comparator*, by J. G. Croad.

*Primary Examiner*—Joseph M. Thesz
*Attorney, Agent, or Firm*—William E. Johnson, Jr.

[57] ABSTRACT

The address scaler outputs of a multichannel analyzer are fed to two comparator circuits in an address decoder, one such address decoder being provided for each energy range of interest in the spectrum of detected gamma rays produced, or occurring, in earth formations surrounding a borehole. The address number from the multichannel analyzer is compared with two numbers preset by switches within the decoder, one group of switches and its associated comparator circuit being determinative of the lower boundary number, and a second group of switches and associated comparator circuit being determinative of the upper boundary number. The outputs from the comparators, one of which is inverted, are AND gated with a STORE pulse from the multichannel analyzer. If the address number from the multichannel analyzer falls within the lower and upper boundary numbers in coincidence with the STORE pulse, an output pulse is generated by the AND gate; otherwise, no output results. The AND gate output is coupled to a count rate meter and recorded. In addition, an intensity enable pulse is generated by a second AND gate having inputs from the two comparator circuits and is coupled back to the multichannel analyzer to allow intensification of the multichannel analyzer oscilloscope readout, thus providing a visual presentation of the region of interest selected by the decoder.

5 Claims, 5 Drawing Figures

PRIOR ART

ADDRESS DECODER FOR USE WITH MULTICHANNEL ANALYZERS

This is a continuation, of application Ser. No. 244,013, filed Apr. 14, 1972, now abandoned.

BACKGROUND OF THE INVENTION

This invention relates to address decoders in general, and specifically to address decoders for use with multichannel analyzers in conjunction with the recording of the natural gamma ray spectra of formations surrounding a well bore.

As is well known in the art, natural gamma rays produced by the earth formations provide an indication of the occurrence of the naturally occurring radioactive elements, such as thorium, potassium and uranium. Since these elements produce gamma rays having different energy levels, a well logging instrument having the capability for measuring the energy of such gamma rays, for example, one having a scintillation counter, thus provides a means of ascertaining the existence of such elements. It is also known in the art to record the total energy spectrum, such a recorded curve being generally referred to by those in the art as a natural gamma ray log.

In theory, at least, the only special surface instrumentation required for such logs are single channel analyzers. However, because it is desired to make very accurate recordings and since variations in logging cable characteristics with depth introduces signal amplitude changes, it has generally been considered necessary to use a multichannel pulse height analyzer in addition to the single channel analyzers to produce the log. The multichannel analyzer in such cases has generally served as a monitor, and the gain of the surface amplifier is adjusted, when necessary, to maintain a selected energy peak in a particular channel of the analyzer. For various other reasons, it has been found convenient and desirable to have a multichannel analyzer in the logging system. Furthermore, those in the art have generally been unable to utilize a multichannel analyzer to provide such logs without the use of one or more single channel analyzers.

It is therefore the primary object of the present invention to provide an address decoder for use with multichannel analyzers;

It is also an object of the invention to provide new and improved circuitry and apparatus for measuring and recording preselected portions of the energy spectrum of gamma rays emanating from earth formations surrounding a well bore;

It is also an object of the present invention to provide new and improved circuitry whereby a multichannel analyzer provides not only an energy spectrum of detected gamma rays but also provides means for measuring and recording a multiplicity of signals corresponding to preselected energy bands within the spectrum limits without the use of single channel analyzers; and It is yet another object of the invention to provide new and improved circuitry for improving the efficiency of a multichannel analyzer.

The objects of the invention are accomplished, generally, with address decoder circuitry which compares the address scaler output of a multichannel analyzer with a predetermined reference and which provides pulse outputs based upon such comparison. As an additional feature, such address decoder circuitry provides means for intensifying the oscilloscope readout associated with the multichannel analyzer relating to the energy range of a given address decoder section.

These and other objects, features and advantages of the present invention will be more readily understood by those skilled in the art from a reading of the following detailed specification and drawing, in which.

Figure 1:
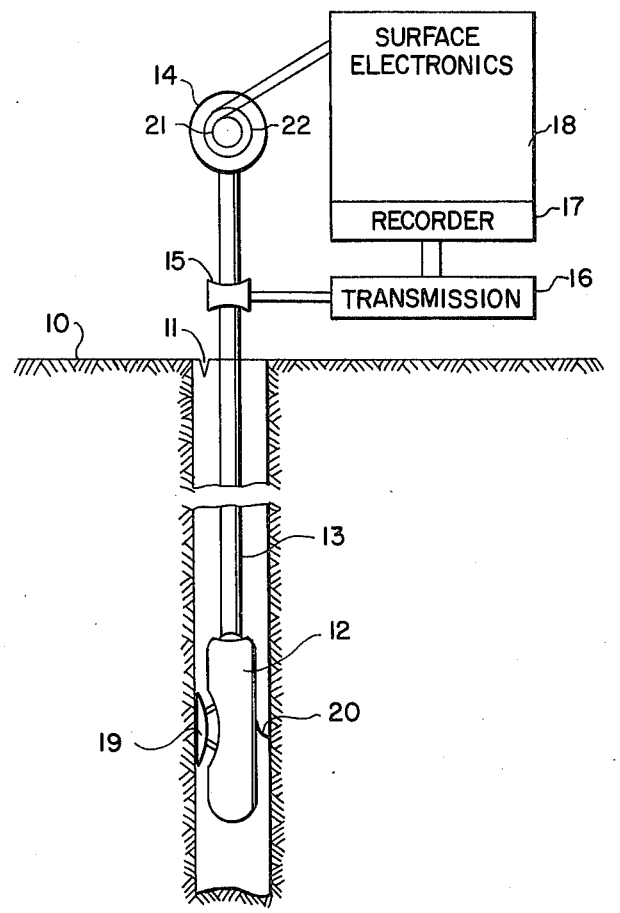
FIG. 1 is a side elevation, partly in cross section, of a borehole logging instrument in operative position and its associated surface circuitry and related equipment.

Referring now to the drawing in more detail and especially to FIG. 1, there is illustrated a portion of the earth's surface 10 traversed by an earth borehole 11. A well logging instrument 12 is suspended in the borehole 11 by logging cable 13, the cable 13 being wound on a drum 14 at the earth's surface. The cable 13 also passes over a measuring sheave 15 to drive a transmission 16 which in turn drives the recorder 17, for example, an X-Y plotter, so that the information recorded thereon from the surface electronics section 18 is related to depth in the borehole. The borehole instrument 12 can be any of the radioactivity borehole logging instruments known in the art, for example, such as that described and illustrated in U.S. Pat. No. Re. 24,226 to R. E. Fearon. Although well logging instrument 12 can be of any suitable type, the instrument 12 is illustrated as having a pad member 19 which is urged against the borehole wall and a spring member 20 which aids in keeping the pad member 19 against the borehole wall. Although the borehole 11 is shown as being uncased, it should be appreciated by those skilled in the art that the borehole 11 can also be cased.

The invention is particularly applicable to logging methods employing a detector of radiation wherein the detector produces a spectrum of pulses indicative of the energy spectrum of the detected radiation. For example, scintillation counters and lithium drifted germanium detectors are capable of producing such pulse spectra when subjected to radiation arising from natural radioactivity of the subsurface formations; or to radiation arising in the formations due to bombardment by a source of neutrons or gamma rays. In particular when formations are irradiated with a source of 14 mev neutrons the elements comprising the formation and borehole materials are caused to emit gamma rays characteristic of the said elements. For example, oxygen atoms so irradiated emit gamma rays of 6.1 mev and carbon atoms emit gamma rays of 4.4 mev. Logging instrumentation capable of selectively detecting and recording the relative intensity of gamma rays of these respective energies can therefore be employed to identify and measure these and other elements surrounding a borehole. The apparatus of the prior art for producing such spectral measurements has been complex, expensive and difficult to operate. The present invention provides a system whereby such logging techniques may be greatly improved.

As is conventional in the art, the electrical signals representative of the detected spectrum of natural gamma rays, for example, are transmitted up the cable 13 and are taken off of slip rings 21 and 22 on the drum 14 and are coupled into the surface electronics section 18.

Figure 2:
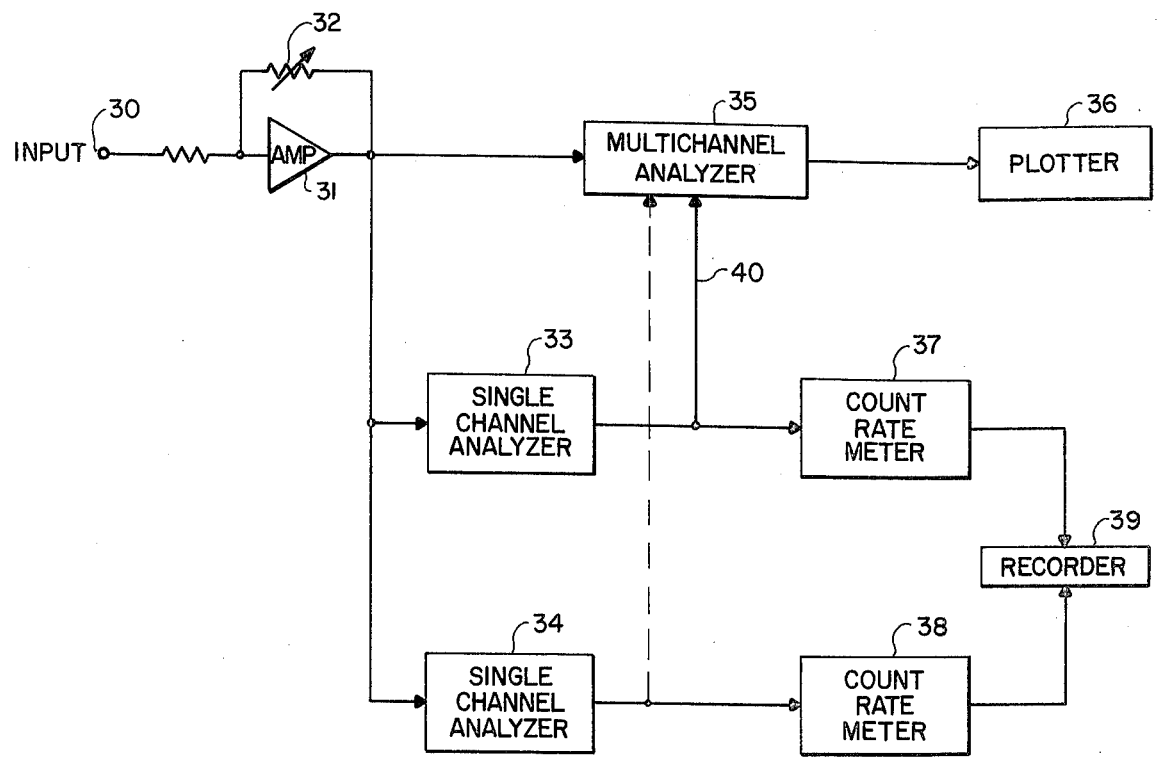
FIG. 2 is a block diagram of a prior art circuit used for providing an energy spectrum of natural gamma rays.

Referring now to FIG. 2, there is illustrated in block diagram circuitry according to the prior art wherein one or more single channel analyzers are utilized in conjunction with a multichannel analyzer to provide an energy spectrum of, for example, natural gamma rays. The signals from the borehole instrument 12 (illustrated in FIG. 1) are coupled into the surface electronics, specifically being connected into the input terminal 30. The analog signal appearing at input terminal 30 is then coupled into an operational amplifier 31 whose gain is controlled by the variable resistor 32 in its feedback loop as is known in the art. The output of the amplifier 31 is then fed into one or more single channel analyzers 33 and 34. The output of the amplifier 31 is also connected into the input of the multichannel analyzer 35 which drives a plotter or printer 36. In such prior art systems, the individual single channel analyzers are calibrated to be responsive to energy peaks or bands. In the case of a system for analyzing the gamma rays associated with the naturally radioactive elements, for example, thorium, potassium and uranium, each produce characteristic spectra. The composite spectrum produced by detection of a mixture of these elements therefore contains spectral peaks and bands indicative of the abundance of each of the respective elements. The outputs of the single channel analyzers 33 and 34 are connected to the conventional count rate meters 37 and 38, respectively, which in turn are connected to a recorder 39. This prior art system is calibrated by using a gamma ray source with a known spectrum. The amplifier gain (that of amplifier 31) is adjusted so that some convenient energy peak, for example that of potassium, is located in a particular channel of the multichannel analyzer. The single channel analyzers are then adjusted individually to pass the desired portion of the spectrum. The single channel amplifier output that is connected into the multichannel amplifier coincidence gate, for example, the output of analyzer 33 by means of conductor 40, allows only those pulses passed by the single channel amplifier to be analyzed and stored by the multichannel analyzer. Therefore, by observing the oscilloscope readout of the multichannel analyzer, the single channel analyzer can easily be adjusted to pass the desired energy region.

With this prior art system, although it makes an acceptable commercial log, there are many faults. First of all, a very expensive instrument, the multichannel analyzer, is used merely as a monitor. Furthermore, although the gain of the amplifier 31 can from time to time be adjusted to allow for drift in signal amplitude occurring during the logging operation, and the single channel analyzers can also be monitored for drift, the procedure is exacting and tedious for the operator. Furthermore, the single channel analyzers generally have relatively poor resolution, and closely spaced energy peaks are difficult to separate.

Figure 3:
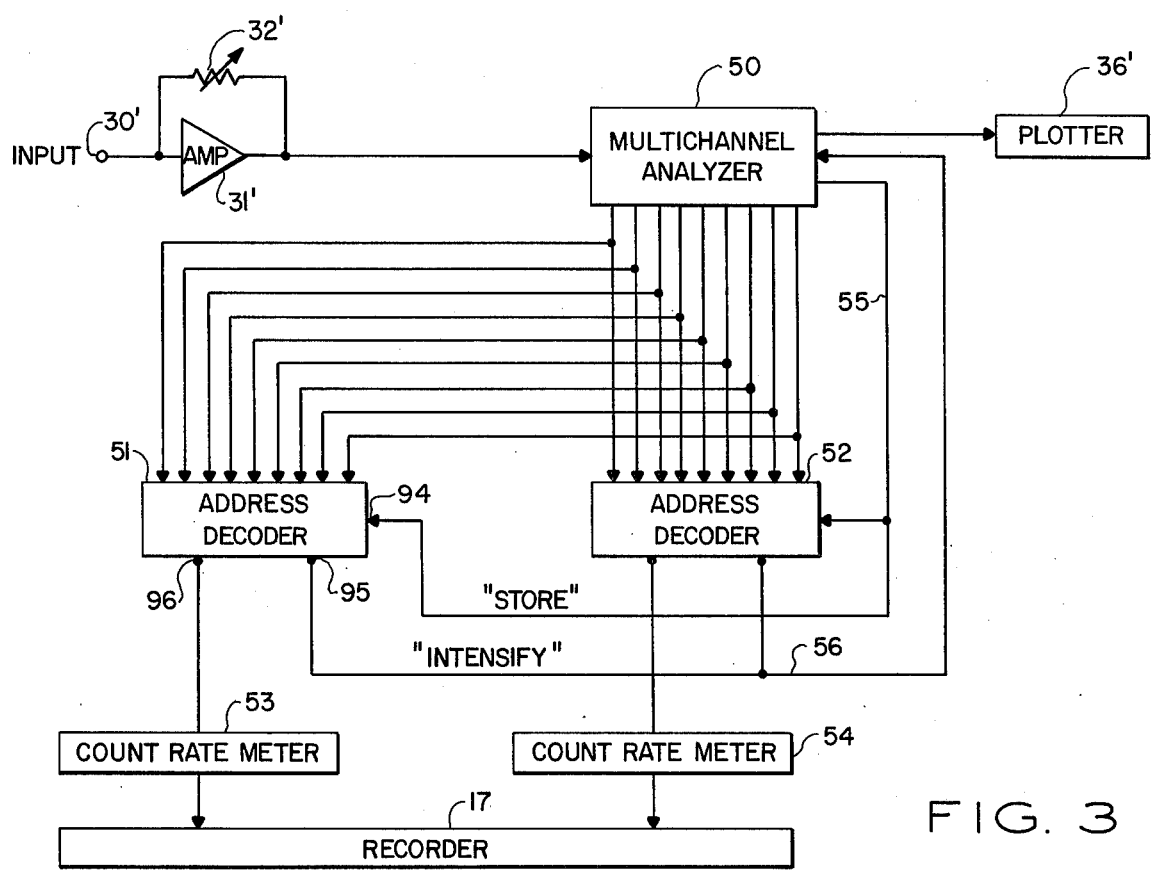
FIG. 3 is a block diagram of the circuitry according to the present invention.

Referring now to FIG. 3, there is shown in block diagram the new and improved circuitry and associated apparatus which overcomes the aforementioned difficulties and faults associated with the prior art system of FIG. 2. The input analog signals appearing from the borehole instrument are connected to the input terminal 30' which in turn are amplified by the amplifier 31' in a manner as determined by the feedback loop and its variable resistor 32'. The output of the amplifier 31' is connected to a multichannel analyzer 50, for example, a model NS-606 manufactured by Northern Scientific, Inc., 2551 West Belt Line, Middleton, Wisconsin 53562. It should be appreciated by those skilled in the art that this particular analyzer has a ferrite core memory arranged for 512 addresses with a storage capacity of $10^6 - 1$ bits per address. The address information, available at the Special Signals plug for external readout devices, is a 9-bit, 5 volt positive logic binary number. This particular analyzer also has a built-in analog-to-digital converter of the Wilkinson type with a 50 megacycle clock. Furthermore, the address scaler 0 outputs are gated at the inputs to the address drivers by a signal controlled by the pulse stretcher circuit within the A/D converter. These gating signals hold the address driver outputs at logical zero during the A/D converter conversion time. After conversion, the gating signal is zero and each address driver output is the inverse of its respective address scaler output. The address scaler is reset to zero at the beginning of the next conversion cycle, this cycle being initiated by the next incoming pulse. Therefore, the address driver outputs do not vary at the 50 MCS rate of the address scaler, but at the much slower rate of the pulse train inputed to the analyzer for analysis. A $\overline{\text{STORE}}$ signal is generated and used within the analyzer during the memory cycle. An inverter is added to the analyzer to isolate and invert this pulse for use in the address decoder.

Referring further to FIG. 3, the address decoder circuits 51 and 52 are connected to the outputs of the multichannel analyzer 50 by nine input lines corresponding to the 9-bit outputs available from the Special Signals plug of the multichannel analyzer 50. The outputs of the address decoders 51 and 52 are connected to the conventional count rate meter circuits 53 and 54, respectively, which in turn are connected to the recorder 17 illustrated in FIG. 1. The output of the multichannel analyzer 50 is also connected to a plotter or printer 36'. As will be described in more detail in FIG. 4, the electrical conductor 55 provides a STORE input into the address decoders 51 and 52. Also as will be described in more detail in FIG. 4, the electrical conductor 56 provides electrical signals from the address decoder back to the oscilloscope section of the multichannel analyzer 50 for intensifying the oscilloscope readout in relation to selected energy ranges.

Figure 5:
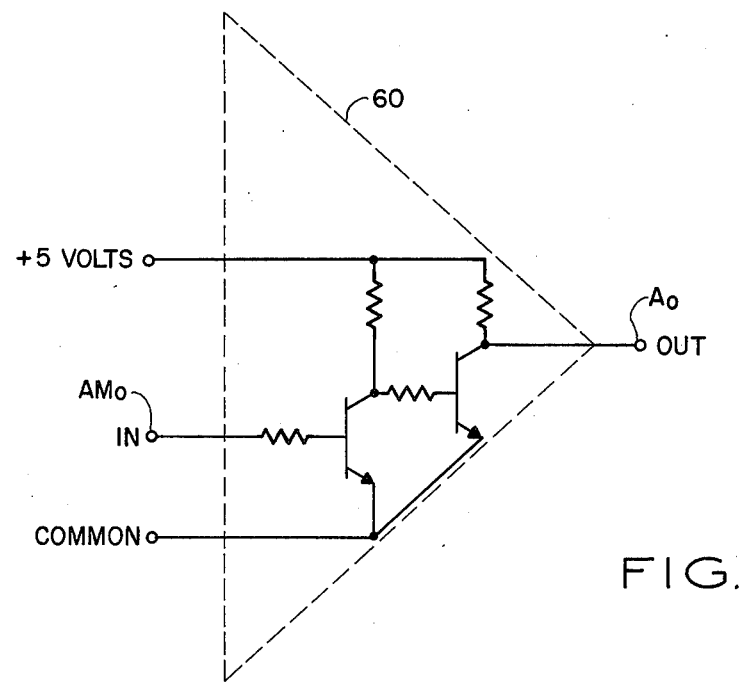
FIG. 5 is a schematic illustration of a typical buffer circuit shown in block diagram in FIG. 4.
Figure 4:
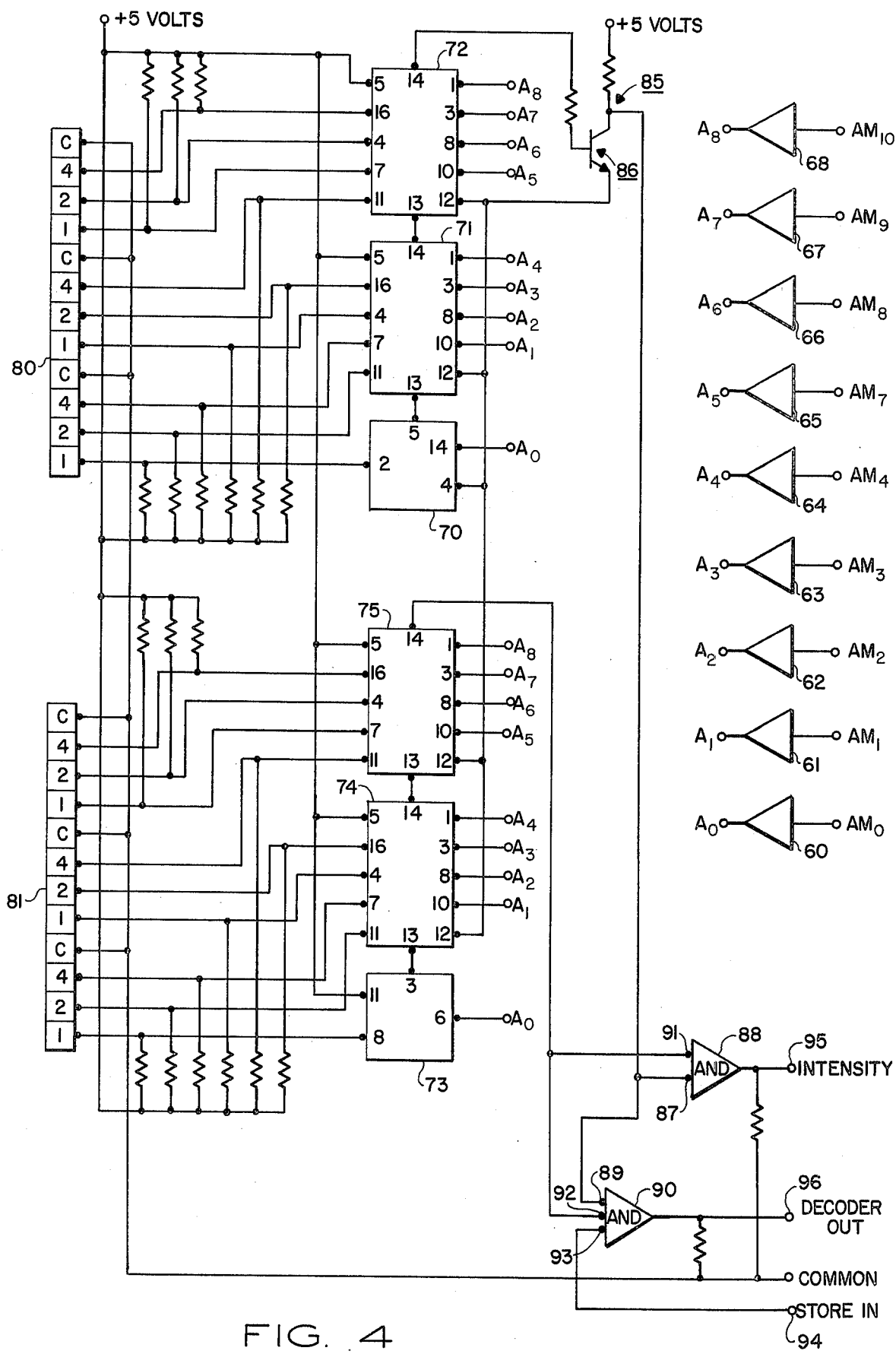
FIG. 4 is a detailed schematic illustration of the address decoder circuit shown in block diagram in FIG. 3.

Referring now to FIG. 4, there is illustrated in greater detail one of the address decoder circuits 51 and 52 shown in block diagram in FIG. 3. Since the address decoder circuits 51 and 52 are identical, only one of such circuits will be illustrated in FIG. 4. The output of the multichannel analyzer 50 is a 9-bit output. These are shown in FIG. 4 as being the input terminals $AM_0$-$AM_4$ and $AM_7$-$AM_{10}$. These nine input terminals are respectively connected through nine buffer circuits having the numerals 60-68, respectively. The buffer circuits 60-68 are conventional, for example, as illustrated in FIG. 5.

Referring again to FIG. 4, the outputs of the buffer circuits 60-68 are connected to the terminals $A_0$-$A_8$, respectively. The terminals $A_0$-$A_8$ are connected into two sets of comparator circuits, the first set being comprised of the circuit blocks 70, 71 and 72, and the second set being comprised of circuit blocks 73, 74 and 75. The circuit blocks 70 and 73 are each one-half of an MC896P Dual Full Adder. The circuit blocks 71, 72, 74 and 75 are each an SN7483 4-bit Full Adder. The adders 70, 71 and 72 are cascaded to provide a 9-bit Full Adder as are the adders 73, 74 and 75. The MC896P Dual Full Adder is commercially availably from Motorola, Semiconductor Division, Phoenix, Arizona. The SN7483 4-bit Full Adder is commercially available from Texas Instruments, Inc. of Dallas, Texas.

An additional number, one from each of the two sets of binary coded octal thumbwheel switches 80 and 81, is coupled to the second set of inputs for each of the comparator sections, respectively. Such switches are commercially available from the Cherry Electrical Products Corporation, Waukegan, Illinois, Model No. T20-07A. The common point of each of the switches 80 and 81 is grounded, and each switch output is returned to +5 volts through a 5.1 k ohm resistor. Thus, it is the complement of the number set in the thumbwheel switch that is summed in each 9-bit adder with the address number. Thus, in the operation of the circuitry according to FIG. 4, a 1 at the adder carry output (pin 14 in block 75 and pin 14 in block 72) results when the address number is greater than the switch selected number; if the output from the comparators is 0, then the address number is equal to, or less than, the switch selected number.

The pin number 14 of the circuit block 72 is coupled into the input of the inverter 85 to provide a 1 output when the address number is equal to, or less than, the preset number and a 0 output when the address number is greater than the preset number. The output of the inverter 85, taken from the collector of the transistor 86, is connected into an input 87 of an AND gate 88 and also to an input 89 of an AND gate 90. The output of the comparator having the circuit block 75 is connected from pin 14 of the circuit block 75 into the input 91 of the AND gate 88 and also to the input 92 of the AND gate 90. The AND gate 90 has an additional input 93 connected to the "STORE IN" terminal 94. The terminal 94 is also illustrated in FIG. 3. The output of the AND gate 88 is connected to an "INTENSITY" terminal 95 which is connected back to the multichannel analyzer 50 by conductor 56 in FIG. 3. The output of the AND gate 90 is connected to a "DECODER OUT" terminal 96 which in turn is connected to the count rate meter circuit 53 in FIG. 3.

In the operation of the circuit of FIG. 4, the output of the lower level comparator, being taken from the circuit block 75, is AND gated to the inverted output of the upper level comparator which is taken from the circuit block 72 in the AND gate 88 and also in the AND gate 90. In the AND gate 90, these two comparator signals are also AND gated in coincidence with the positive STORE pulse. The STORE pulse is passed by the gate 90 if, and only if, the address number corresponding to a pulse digitized and stored by the analyzer is greater than the number set in the switches driving the lower level comparator and less than or equal to the number set in the switches driving the upper level comparator. The output from the AND gate 90 is the decoded output used to drive a count rate meter 53 or other readout device. By way of specific example, the gain of amplifier 31 can be so adjusted that this particular multichannel analyzer has an address digital number falling within the range of 141 to 169 for the peak corresponding to the energy of gamma rays emitted by oxygen when excited by fast neutron irradiation. This range corresponds to a setting of 215 on the octal switch 81 and a setting of 251 on the octal switch 80.

By setting the switches 80 and 81 to these numbers, i.e., 251 and 215, respectively, the address decoder circuit 51 is thus responsive to such oxygen peaks, and will produce a pulse to the count rate meter 53 for each such pulse stored in the multichannel analyzer 50.

The two comparator outputs are also AND gated in the AND gate 88 that feeds a signal back to the multichannel analyzer 50 for intensifying the oscilloscope readout. The signal is paralleled with the signal generated within this particular analyzer that enables every 16th address channel displayed on the oscilloscope to be intensified. The coincidence gate is operable only when the analyzer is accumulating data, but the intensity enable gate 88 operates in either the accumulate or readout mode of the analyzer.

While it may still be desirable to have the operator of the circuit according to the present invention monitor signal amplitude changes and adjust the gain of the amplifier 31', those skilled in the art will recognize that one or more of the address decoder circuits can be used to select one or more intervals for reference in a servo-coupled stabilization circuit, if desired, to eliminate such a manual monitoring operation.

Thus, it should be appreciated that there has been described and illustrated herein the preferred embodiment of a circuit and its related apparatus which enables the use of a multichannel analyzer in providing a recording of selected regions of an energy spectrum of natural gamma rays in formations surrounding an earth borehole. However, obvious modifications will appear to those skilled in the art. For example, while there has been illustrated and described herein a pair of address decoders 51 and 52 which can be used for two specific energy ranges, such as those resulting from carbon and oxygen, to name but two examples, those skilled in the art will recognize that any number of such decoders can be used to provide the spectrum of interest. Furthermore, while the preferred embodiment contemplates the use of a particular analyzer having address information based upon 9-bit, positive-logic binary numbers, other similar type systems can be used which embody the principles of the present invention wherein an output pulse is provided for an input pulse supplied to the multichannel analyzer falling within the "window" as selected by the switches within the address decoder circuit.

The embodiments of the invention in which an exclusive property or privilege is claimed are defined as follows:

1. A system for producing a radioactivity log indicative of the number of gamma rays falling within at least two predetermined energy bands, comprising:
an elongated well logging instrument adapted to traverse an earth borehole;
means within said instrument for detecting gamma radiation;
means within said instrument to generate electrical signals indicative of said detected radiation;
means to transmit said electrical signals to the earth's surface from said well logging instrument;
a multichannel analyzer at the earth's surface having an unknown address scaler output, said analyzer being adapted to receive said electrical signals;
a first address decoder circuit, comprising:
means for comparing said unknown address scaler output with first and second reference words; and means to generate a first voltage pulse in response to said address scaler having a numerical value equal to or higher than said first reference word while being less than or equal to said second reference word;

a second address decoder circuit, comprising:

means for comparing said unknown address scaler output with third and fourth reference words; and means to generate a second voltage pulse in response to said address scaler having a numerical value equal to or higher than said third reference word while being less than or equal to said fourth reference word.

2. A system for producing a radioactivity log indicative of the number of gamma rays falling within at least two predetermined energy bands, comprising:

an elongated well logging instrument adapted to traverse an earth borehole;

means within said instrument for detecting gamma radiation;

means within said instrument to generate electrical signals indicative of said detected radiation;

means to transmit said electrical signals to the earth's surface from said well logging instrument;

a multichannel analyzer having an unknown address scaler output, said analyzer being adapted to receive said electrical signals;

a first address decoder circuit, comprising:

means for comparing said unknown address scaler output with first and second reference words; and means to generate a first voltage pulse in response to said address scaler having a numerical value equal to or higher than said first reference word while being less than or equal to said second reference word, and to the coincidental occurrence of a third voltage pulse;

a second address decoder circuit, comprising:

means for comparing said unknown address scaler output with third and fourth reference words; and means to generate a second voltage pulse in response to said unknown address scaler having a numerical value equal to or higher than said third reference word while being less than or equal to said fourth reference word, and to the coincidental occurrence of a fourth voltage pulse.

3. A system for producing a radioactivity log indicative of the number of gamma rays falling within a predetermined energy band, comprising:

an elongated well logging instrument adapted to traverse an earth borehole;

means within said instrument for detecting gamma radiation;

means within said instrument to generate electrical signals indicative of said detected radiation;

means to transmit said electrical signals to the earth's surface from said well logging instrument;

a multichannel analyzer having an unknown address scaler output, said analyzer being adapted to receive said electrical signals;

an address decoder circuit for decoding an address scaler, comprising:

means for comparing said unknown address scaler with two reference words; and means to generate a first voltage pulse in response to said address scaler having a numerical value equal to or higher than one of said reference words while being less than or equal to the other of said reference words.

4. A system for producing a radioactivity log indicative of the number of gamma rays falling within a predetermined energy band, comprising:

an elongated well logging instrument adapted to traverse an earth borehole;

means within said instrument for detecting gamma radiation;

means within said instrument to generate electrical signals indicative of said detected radiation;

means to transmit said electrical signals to the earth's surface from said well logging instrument;

a multichannel analyzer having an unknown address scaler output, said analyzer being adapted to receive said electrical signals;

means for comparing said unknown address scaler with two reference words; and means to generate a first voltage pulse in response to said address scaler having a numerical value equal to or higher than one of said reference words while being less than or equal to the other of said reference words, and to the coincidental occurrence of a second voltage pulse.

5. The circuit according to claim 4 wherein said comparison means generates a third voltage pulse in response to said address scaler having a numerical value equal to or higher than one of said reference words and generates a fourth voltage pulse in response to said address scaler having a numerical value equal to or lower than the other of said reference words.

* * * * *